United States Patent [19]

Ueno et al.

[11] 4,172,897

[45] Oct. 30, 1979

[54] SORBIC ACID-CONTAINING POWDER OR GRANULES

[75] Inventors: Ryuzo Ueno, Nishinomiya; Toshio Matsuda, Itami; Shigeo Inamine, Kobe, all of Japan

[73] Assignee: Kabushiki Kaisha Ueno Seiyaku Oyo Kenkyujo, Osaka, Japan

[21] Appl. No.: 848,667

[22] Filed: Nov. 4, 1977

[51] Int. Cl.$^2$ ............... A61K 31/19; A61K 33/42; A23L 3/34; A23B 4/12

[52] U.S. Cl. ............................. 424/317; 424/14; 424/128; 426/532

[58] Field of Search ................. 424/317, 128, 14; 426/532

[56] References Cited

U.S. PATENT DOCUMENTS

| | | | |
|---|---|---|---|
| 2,379,294 | 6/1945 | Gooding | 424/317 |
| 2,714,083 | 7/1955 | Fergusen, Jr. | 424/317 |
| 3,139,378 | 6/1964 | Gooding | 424/317 |
| 3,404,987 | 10/1968 | Kooistra et al. | 424/317 |
| 3,681,091 | 8/1972 | Kohl et al. | 426/532 |
| 3,692,534 | 9/1972 | Ueno et al. | 426/532 |
| 3,899,600 | 8/1975 | Sweet | 426/532 |
| 4,076,850 | 2/1978 | Nickerson et al. | 426/532 |
| 4,083,999 | 4/1978 | Drury et al. | 424/317 |
| 4,122,187 | 10/1978 | Kotani et al. | 424/317 |

FOREIGN PATENT DOCUMENTS

| | | |
|---|---|---|
| 1115231 | 2/1960 | Fed. Rep. of Germany. |
| 2744243 | 4/1978 | Fed. Rep. of Germany ........... 426/532 |
| 2209512 | 8/1974 | France. |
| 49-31091 | 8/1974 | Japan ........................................ 424/317 |
| 50-83324 | 7/1975 | Japan. |

*Primary Examiner*—Donald B. Moyer
*Attorney, Agent, or Firm*—Sherman & Shalloway

[57] ABSTRACT

Sorbic acid-containing powder or granules free from scatterability and rapidly soluble in water consisting of 5-90% by weight of finely divided sorbic acid with particle diameter of 50μ or less, 10-95% by weight of an easily water-soluble substance which is a solid at normal temperature and 0-2% by weight of hydrophilic surface active agent, characterized by having particle diameter of 300μ or more. The above sorbic acid-containing powder or granules can be obtained by drying after making powder or granules having particle diameter of 300μ or more from a mixture consisting of finely divided sorbic acid with particle diameter of 50μ or less, an easily water-soluble substance which is solid at normal temperature, water and/or an aqueous organic solvent and optionally, a hydrophilic surface active agent, or by making powder or granules having particle diameter of 300μ or more from the dry mixture after drying said mixture.

7 Claims, No Drawings

SORBIC ACID-CONTAINING POWDER OR GRANULES

This invention relates to sorbic acid-containing powder or granules free from scatterability and rapidly dissolvable in water, as well as to a process for the production and usage thereof.

Since sorbic acid shows a strong antibacterial force in low toxicity, it is widely used as a preservative agent for drinks and foods, feeds and so on (hereinafter may be called foods for short). Many studies were made of antibacterial force and physical properties of sorbic acid and explanations are given in detail in the "New Food Industry", Vol. 7, No. 10, pp. 48–75, for instance.

Sorbic acid is sparingly soluble in water and solubility for water is in the order of 0.16 g/100 ml at normal temperature, but it dissolves more in water of which the PH value is high by formation of salts. Sorbic acid, however, shows antibacterial action in a form of a free acid and in the case of using as a preservative agent it is preferred to lower the PH value of foods as much as possible. The amount of sorbic acid added varies according to the kind of foods, but in general, is about 0.05–0.3% by weight. This addition amount is close to the saturated solubility for water of sorbic acid and it is extremely difficult to perfectly dissolve in foods at low PH values.

As a means for improving the solubility of sorbic acid it is considered to divide it finely. Powdered sorbic acid, however, shows a strong irritating action of the mucous membranes of human beings and it will worsen working environment to make sorbic acid into finely divided powder high in the scatterability. In some cases, therefore, there may be used coarse grained sorbic acid having somewhat greater particle diameter falling within given limits be removing off fine particles so as not to scatter. In this case, the solution rate of sorbic acid is of course lowered and it becomes necessary to take such means as extension of heating and stirring time, which is not preferred in terms of working efficiency.

In many cases, on the other hand, salts of sorbic acid are used for improving the solubility. The mucous membrane irritating action can be simultaneously avoided by use of salts, but the antibacterial action inherent in sorbic acid cannot exhibit itself as it is kept in a salt condition. Sorbates somewhat enhance the PH value of foods in which they were incorporated. In order, therefore, to conform the PH value when adding sorbates to foods to the PH value when adding sorbic acid, viz., to make sorbates exhibit the equivalent antibacterial action to that of sorbic acid it is required to counteract the weak alkalinity of sorbates and add other acids in the amount corresponding to the acidity of sorbic acid. In addition, sorbates are greater in the molecular weight than sorbic acid and it is necessary to more add by that amount, which is not economical.

Proposals have been made for various processes designed to improve the defects with sorbic acid while maintaining the efficacy of sorbic acid. Of these some processes succeeded in a tentative way, but under present situations, are not put to practical use in food plants. For instance, a proposal is made for a process which comprises using sorbic acid as alcohol solution, and according to this process, the solubility and mucous membrane irritative property of sorbic acid are improved, and added to this, there can be obtained equivalent antibacterial effect to that in the case of using sorbic acid in the form of solids in various foods. This process, however, because of using alcohol unnecessary for foods, becomes high in manufacture costs and is not economical as is the case with the process involving the using of alkali salts.

The instant inventors studied in various ways with the purpose of improving the defects, in consequence of which it was found that sorbic acid preparations free from scatterability (without irritating the mucous membrane accordingly) and capable of showing the inherent antibacterial force with sorbic acid contained rapidly dissolving in water could be obtained by a simple and economical means of making finely divided sorbic acid into powder or granules having relatively great particle diameter by using, as a thinner or binder, an easily water-soluble substance which was a solid at normal temperature.

Thus, the instant invention provides sorbic acid-containing powder or granules, free from scatterability and fast soluble in water, comprising 5–90% by weight, preferably 10–80% by weight, of finely divided sorbic acid having particle diameter of 50μ or less, 10–95% by weight, preferably 20–90% by weight, of an easily water-soluble substance which is a solid at normal temperature and 0–2% by weight, preferably 0.05–1% by weight, of a hydrophilic surface-active agent, characterized by having particle diameter of 300μ or more, preferably 500–1500μ.

Such sorbic acid-containing powder or granules, according to the instant invention, are obtained by drying after making powder or granules having particle diameter of 300μ or more from a mixture consisting of finely divided sorbic acid with particle diameter of 50μ or less, an easily water-soluble substance which is solid at normal temperature, water and/or an aqueous organic solvent and optionally, a hydrophilic surface active agent, or by making powder or granules having particle diameter of 300μ or more from the dry mixture after drying said mixture.

The easily water-soluble substance which is a solid at normal temperature is preferably selected from among additives indispensable for the manufacture of foods. Of these those ones which are capable of addition at the same time as sorbic acid is added can all be used in the instant invention. As substances of this kind mention is made of sugars, such as cane sugar, grape sugar, fruit sugar and so on; sugar alcohols, such as sorbitol, malbitol and so on; organic acids, such as citric acid, malic acid, tartaric acid, fumaric acid and so on; salts of organic acids, such as the respective sodium salts or potassium salts of acetic acid, citric acid, malic acid, tartaric acid, fumaric acid and sorbic acid, monosodium glutamate, sodium inosinate and so on, as well as sodium primary phosphate, sodium secondary phosphate, sodium tertiary phosphate, sodium pyrophosphate, acid sodium pyrophosphate, sodium metaphosphate and sodium polyphosphate or their corresponding potassium salts. These substances are preferably selected according to the kind of foods and can be used alone or as a mixture of 2 members or more.

Sorbic acid is used as finely divided one with particle diameter of 50μ or less so as to be able to immediately dissolve when added to foods.

Powder or granules of the instant invention may contain, as desired, a small amount of a hydrophilic surface active agent to improve the wetting for water of sorbic acid. As the hydrophilic surface active agent, for instance, cane sugar fatty acid esters, preferably those ones which are 11 or more in the HLB, lecithins, preferably high purity lecithins, fatty acid esters of sorbitan (SPAN-20, for instance), reaction products between sorbitan fatty acid esters and polyoxyethylenes (TWEEN-20, for instance) and so forth are used alone or as a mixture of two members or more. In the case of using salts as the easily water-soluble substance, in some cases, no surface active agents are required. This is considered ascribable to salts showing the action for improving the wetting for water of sorbic acid particles.

The sorbic acid-containing powder or granules of the instant invention contain 5–90% by weight, preferably 20–80% by weight, of finely divided sorbic acid having particle diameter of $50\mu$ or less, preferably $30\mu$ or less and 10–95% by weight, preferably 20–80% by weight, of an easily water-soluble substance which is a solid at normal temperature, and besides, may also contain 2% by weight or less, preferably 1% by weight or less, of a hydrophilic surface active agent. When the amount of sorbic acid is less than 5% by weight, the solubility is good, but more than necessary easily water-soluble substances will be added to foods, which is not desirable. When it is in excess of 90% by weight, the amount of the easily water-soluble substance will become relatively small and the solubility will be lowered. The sorbic acid content is preferably determined according to the kind of foods in which it would be added.

The sorbic acid-containing powder or granules of the instant invention have particle diameter of $300\mu$ or more, preferably up to about $1500\mu$ so as not to scatter and irritate the mucous membrane.

The powder or granules of the instant invention can further contain ordinary additives or assistants such for instance as a decay promoter or binder. As the decay promoter, for instance, glycerine, propylene glycol, starch and so forth are added generally in the amount of 0.5–10% by weight with regard to powder or granules. As the binder, for instance, α-starch, gum arabic, carboxymethyl cellulose, methyl cellulose, guagum and other paste, sugars and the like are added generally in the amount of 0.1–5% by weight with regard to powder or granules.

The sorbic acid-containing powder or granules of the instant invention can be prepared by usual means for preparing powder or granules. Preferably, the aforesaid respective components are added in a relatively small amount of water and/or organic solvent to first make a dispersed substance. After that, the dispersed substance is pulverized and dried, or granules are made from said dispersed substance and dried, or said dispersed substance is dried and then pulverized. The aforesaid respective components could also be added in a relatively large amount of water and/or organic solvent to first make a suspension and then powder or granules are directly prepared from the suspension by spray-drying or vacuum-drying. In the case of using the surface active agent it is preferred to dissolve the surface active agent in water and then add the remaining components. In the case of using, as the easily water-soluble substance, those substances of low melting temperatures, such as sorbitol, it will suffice to admix finely divided sorbic acid (and surface active agent) to the melt of the easily water-soluble substance, followed by cooling and milling. The dry step could be omitted.

As the organic solvent, for instance, methanol, ethanol, propanol, isopropanol, acetone and so forth can be used alone or as a mixture, and ethanol is particularly preferred.

The powder or granules of the instant invention can be used by adding as the preservative agent in the usual way to general drinks and foods or feeds. The powder or granules will immediately disperse and dissolve when added to foods, and the effect as the preservative agent after addition remains the same as that of the known sorbic acid preparations.

The amount of sorbic acid contained in the powder or granules and the kind of the easily water-soluble substance, as mentioned earlier, are determined according to foods in which they are incorporated. The following will be illustrated. In the case of adding to pickles, since primarily organic acids are well used in the pickles, a combination of sorbic acid and malic acid or citric acid is preferred. In the case of adding to wine, it is a combination of sorbic acid and tartaric acid or citric acid that is preferred. However, since the indispensable addition amount of sorbic acid with respect to wine is small (in general, 0.02% or less), it is preferred to use powder or granules less in the sorbic acid content. In the case of adding to jam or soft moist type dog foods, since a great deal of sugar is primarily used as an indispensable additive therein, it is a combination of sorbic acid and sugar that is suitable. In the case of cat food where the PH is relatively low and hardly any sugars are used combinations of sorbic acid with organic acids such as citric acid, malic acid and so on are recommended. Mention can be made of mayonnaise, margarin, fish sausage, meat sausage and so on as other foods for subject.

In the case of adding at the time of preparing the foods powder or granules of the instant invention consisting of the aforesaid combinations of sorbic acid with the specified easily water-soluble substances (organic acids, tartaric acid or sugars), additives (organic acids, tartaric acid or sugars) to be primarily added to the foods can be less used by the amount of the easily water-soluble substances contained in the powder or granules of the instant invention. Therefore, the increase in the costs resulting from excess additives can be avoided.

The instant invention will be specifically explained by way of non-limitative Examples as follows.

EXAMPLE 1

4 g of cane sugar fatty acid ester (HLB 15) and 20 g of glycerine were added to 150 ml of water and dissolved by heating at 80° C. The aqueous solution obtained was cooled at about 50° C. On the other hand, 1000 g of finely divided sorbic acid (average particle diameter $30\mu$) and 976 g of DL-malic acid were placed in a kneader and uniformly mixed together. While adding the aforesaid aqueous solution the mixture was kneaded for 30 minutes by means of kneader. Then, columnar granules 1 mm in diameter were fabricated from this kneaded substance by means of extrusion type granulator and dried in hot air at 70° C.

The sorbic acid-containing granulated product so obtained was suitable as one for pickles.

EXAMPLE 2

600 g of finely divided sorbic acid (average particle diameter $30\mu$) and 388 g of citric acid were placed in the kneader. Then the mixture was kneaded for 30 minutes with addition of aqueous solution prepared by dissolving 2 g of cane sugar fatty acid ester (HLB 15) and 10 g of glycerine in 100 ml of water. The resultant kneaded substance was milled by means of pulverizer into granules taking unfixed forms 0.3–1 mm in particle diameter. The granules were dried in hot air at 70° C.

The sorbic acid-containing granules which took unfixed forms were suitable as ones for pickles or for wine.

EXAMPLE 3

Aqueous solution prepared by dissolving 28 g of sugar and 2 g of cane sugar fatty acid ester (HLB 11) in 300 ml of water was added to a mixture of 700 g of finely divided sorbic acid (average particle diameter 20μ) and 270 g of acid sodium pyrophosphate powder and kneaded for 30 minutes in the kneader. Then, this kneaded substance was milled by means of pulverizer and powder 0.3–0.7 mm in particle diameter was sieved and dried in hot air at 70° C.

The sorbic acid-containing powder so obtained was suitable as one for fish and meat sausages.

EXAMPLE 4

100 ml of water was added to 600 g of sorbitol powder and dissolved by heating at 80° C. 1 g of high purity lecithin was added to the solution obtained and dissolved. With addition of 200 g of finely divided sorbic acid (average particle diameter 20μ) the mixture was stirred and homogenized by means of homomixer. The suspension obtained was cooled at 70° C. While mixing in the kneader with addition of 199 g of sorbitol powder as seed crystals, it was cooled down to room temperature. Whereby there were formed small massed sorbitol particles containing sorbic acid particles. After pulverization particles 0.3–0.7 mm in particle diameter were sieved and dried.

This product was applied to drinks and foods using sorbitol and sorbic acid, such as pickles, jam, mayonnaise and so on.

EXAMPLE 5

449.5 g of powdered sugar (prepared by pulverizing cane sugar) and 50 g of finely divided sorbic acid (average particle diameter 30μ) were mixed together. With addition of mixed solution consisting of 0.5 g of "SPAN-20", 7.5 ml of ethanol and 27 ml of water the mixture was kneaded for 30 minutes in the kneader. Columnar granules 0.8 mm in diameter were fabricated from this kneaded substance by means of extrusion type granular and then dried.

This product was suitably used for jam, mayonnaise and dog food.

EXAMPLE 6

350 g of sodium secondary phosphate.dodecahydrate was placed in the kneader with a jacket and melted by heating at 40° C. 100 g of finely divided sorbic acid with average particle diameter of 25μ was added to this melt and stirred to bring to uniformly suspended condition. After that, with addition of 50 g of anhydrous sodium secondary phosphate the mixture was cooled down to 30° C. for solidification with further continued stirring. Solids were further left to stand for 2 hours at 20° C. Then, they were pulverized to sieve powder 0.3–0.7 mm in particle diameter.

EXAMPLE 7

770 g of sodium citrate and 200 g of finely divided sorbic acid (average particle diameter 20μ) were placed in the kneader and uniformly mixed together. After that, aqueous solution prepared by dissolving 20 g of cane sugar and 10 g of glycerine in 100 ml of water was added to the resultant mixture and further kneaded for 30 minutes. The kneaded substance was dried and then pulverized to sieve particles 0.3–0.7 mm in particle diameter.

Sorbic acid-containing powder so obtained was suited to cat food.

EXAMPLE 8

600 g of finely divided sorbic acid (average particle diameter 30μ) and 389 g of citric acid powder were placed in the kneader. Then, with addition of aqueous solution prepared by dissolving 1 g of "TWEEN-20" and 10 g of glycerine in 100 ml of water the mixture was kneaded for 30 minutes. The kneaded substance was pulverized to sieve particles 0.3–0.7 mm in particle diameter.

EXAMPLE 9

100 ml of water was added to 600 g of sorbitol powder and dissolved by heating at 80° C. 0.5 g of "TWEEN-20" and then 200 g of finely divided sorbic acid (average particle diameter 30μ) were added to the solution obtained and homogenized by stirring in the homomixer. The suspension obtained was cooled down to 70° C. After that, while mixing in the kneader with addition of 199.5 g of sorbitol powder as seed crystals the mixture was cooled down to room temperature. Whereby there were formed small massed sorbitol particles containing sorbic acid particles. These particles were dried and then pulverized to sieve particles 0.3–0.7 mm in particle diameter.

EXAMPLE 10

50 ml of water, 378 g of citric acid (monohydrate), 10 g of cane sugar, 10 g of glycerine and 2 g of cane sugar fatty acid ester (HLB 15) were mixed together and made into solution by heating at 80° C. On the other hand, 600 g of finely divided sorbic acid (average particle diameter 20μ) was placed in the kneader and kneaded with addition of said solution. Columnar granules 0.8 mm in diameter were fabricated from this kneaded substance by means of extrusion type granulator and dried to make products.

EXAMPLE 11

While mixing in the kneader 500 g of finely divided sorbic acid (average particle diameter 20μ) and 500 g of potassium citrate powder were kneaded for 30 minutes with addition of 200 ml of water. Columnar granules 0.8 mm in diameter were fabricated from this kneaded substance by means of extrusion type granulator and dried to make products.

EXAMPLE 12

239 g of powdered sugar (ground cane sugar) and 750 g of finely divided sorbic acid (average particle diameter 30μ) were thoroughly mixed together. After that, solution in which 10 g of glycerine and 1 g of high purity soybean lecithin were dissolved in 100 ml of water was added on to the mixture obtained and kneaded together in the kneader for 20 minutes. Columnar granules 0.8 mm in diameter were formed from this kneaded substance by means of the extrusion type granulating machine, followed by drying.

The product so obtained was preferable as one for dog food.

EXAMPLE 13

249 g of powdered potassium sorbate was thoroughly mixed with 750 g of finely divided sorbic acid (average particle diameter 30μ). Solution in which high purity soybean lecithin was dissolved in 100 ml of water was added on to the mixture obtained and kneaded together by means of kneader for 20 minutes. Columnar granules 0.8 mm in diameter were formed from this kneaded substance by means of the extrusion type granulating machine.

The product so obtained was suited to margarine.

EXAMPLE 14

5 kg of water-washed material cucumbers (about 5-10 cm long) and 5 l of salt water (10° Bé) were placed in a tub. The tub was covered and a light weight stone was laid thereon to pickle at 30° C. Two days later common table salt was further added to maintain 10° Bé. It was fermented for three weeks in such condition and checking was made of the condition where the membrane-producing yeast occurred during the fermentation. The occurrence of the membrane-producing yeast is not desirable because it becomes the cause of spoiling flavor and of putrefaction. The preparation to add was indicated in Table-1 below, but it was added by dissolving in advance in the aforesaid salt water.

As is indicated in Table-1, obviously excellent results could be obtained in the run of the instant invention in comparison with control.

Table 1

| Test Run | PH | Number of days for preservation (30° C.) | | | | | |
|---|---|---|---|---|---|---|---|
| | | 3 | 7 | 11 | 14 | 18 | 21 |
| Non-addition (control) | 6.5 | — | + | ++ | +++ | +++++ | not measured |
| Potassium sorbate 0.13% (control) | 6.7 | — | — | — | — | + | ++ |
| Example 2 0.16% (instant invention) | 4.1 | — | — | — | — | — | — |

— indicates no changing.
+ ~ +++++ indicates the degree to which putrefaction occurred.

EXAMPLE 15

As dog food materials minced poultry by-product, ox liver and ox tongue were placed in the kneader with a jacket and mixed by application of heat for 5 minutes. After that, cane sugar, soybean powder, propylene glycol, sorbitrol, water and preparations as indicated in Table-2 were added and mixed by application of heat for another 10 minutes. Further, water held at 85° C. was flowed down the jacket of kneader to heat the dog food material. The dog food so obtained was wrapped in plastic film and cooled down to room temperature (25° C.). It was placed in aseptic Schale and covered. It was preserved at 30° C. and antiseptic tests were conducted.

Furthermore, the composition of the dog food material above was as follows.

| | |
|---|---|
| Poultry by-products | 35.0% |
| ox liver | 5.0 |
| ox tongue | 5.0 |
| cane sugar | 5.0 |
| soybean powder | 45.0 |
| propylene glycol | 2.0 |
| 70% sorbitol solution | 1.5 |
| water | 1.5 |

Table 2

| Test Run | PH | Water content (%) | Number of days for preservation (30° C.) | | | | | | |
|---|---|---|---|---|---|---|---|---|---|
| | | | 7 | 14 | 21 | 28 | 35 | 42 | 49 |
| Non-addition of preparation (control) | 6.55 | 32.1 | — | — | + | + | ++ | +++ | +++++ |
| Potassium sorbate 0.26% (control) | 6.59 | 32.5 | — | — | — | + | + | + | ++ |
| Sorbic acid 0.2% (control) | 6.37 | 32.1 | — | — | — | — | — | + | + |
| Product of Example 12 0.26% (instant invention) | 6.36 | 32.0 | — | — | — | — | — | — | — |

— indicates no changing.
+ ~ +++++ indicates the degree to which putrefaction occurred.

As is clear from Table-2, the product of the instant invention shows the best result in the antiseptic effect. With the composition of dog food putrefaction by bacteria hardly occurs since it is low in the water content and high in the sugar concentration. Putrefaction by molds and yeasts, however, occurs. In general, potassium sorbate is used for preventing putrefaction by molds and yeasts. For its reason sorbic acid is effective for lowering the PH and increasing the antiseptic effect, but in the dog food which is low in the water content and high in the sugar concentration it is very bard to completely dissolve. This imbalance leads to the imbalance in the antiseptic effect. On the contrary, in the case of potassium sorbate, it is inferior in the antiseptic effect because of its high solubility, but it can be perfectly dissolved and it is possible to insure preservation for a given period of time. The product of the instant invention improved the defect of sorbic acid being hardly dissolvable while making the most of merits with sorbic acid that it should be high in the antiseptic effect. Whereby the preservability of dog food could be further improved.

EXAMPLE 16

Observations were made of the condition where the sorbic acid-containing granules of the instant invention obtained in Example 1, sorbic acid-containing powder of the instant invention obtained in Example 6, finely divided sorbic acid (average particle diameter 30μ) and coarse powdered sorbic acid (particle diameter 200–600μ) were dissolved in water, and measurements were made of the amounts of sorbic acid dissolved.

Experiments and measurements were conducted as follows. The respective specimens were added to 500 ml of water held at 30° C. in such amounts as to reach 0.5 g (0.1%) as sorbic acid stirred under given conditions by means of electro-magnetic stirrer. Immediately after, 1 minute after, 5 minutes after, 10 minutes after and 20 minutes after the specimen was added observations were made of the solution condition. At the same time, 2–3 ml of solution was taken by pipettes attached with filter paper. It was diluted with water and by measuring the ultraviolet region absorbance the amount of sorbic acid dissolved in water was determined.

The results were tabulated in Table-3. The granules and powder of the instant invention dissolved in the amount of 90% or more one minute after addition and dissolved perfectly 10 minutes later. On the other hand sorbic acid powder dissolved only in the amount of 65.3% or 62.4% even 20 minutes after addition.

Table 3

| Specimen (particle diameter μ) | Dissolved condition (parentheses indicate the amount of sorbic acid dissolved) | | | | |
|---|---|---|---|---|---|
| | immediately after addition | 1 minute later | 5 minutes later | 10 minutes later | 20 minutes later |
| Granules of Example 1 (1000) | immediately dispersed and solution turned turbid | mostly dissolved, but some small masses remained in the bottom of solution (93%) | mostly dissolved, but slightly remained in the bottom of solution (98%) | entirely dissolved (100%) | — |
| Powder of Example 6 (300–700) | immediately dispersed and solution turned turbid | mostly dissolved, but slightly remained in the bottom of solution (91.3%) | mostly dissolved, but slightly remained in the bottom of solution (97.2%) | entirely dissolved (100%) | — |
| Finely divided sorbic acid (average 30) | all came up to the surface of solution | mostly came up to the surface of solution (82%) | mostly came up to the surface of solution (18.3%) | mostly came up to the surface of solution (28.3%) | undissolved substances remained floated on the surface of solution (65.4%) |
| Coarse powdered sorbic acid (200–600) | all came up to the surface of solution | mostly came up to the surface of solution (7.5%) | mostly came up to the surface of solution (17.2%) | mostly came up to the surface of solution (25.4%) | undissolved substances remained floated on the surface of solution (62.4%) |

What we claim is:

1. A readily water-soluble food preservation additive powder or granule composition consisting essentially of 5 to 90% by weight of finely divided sorbic acid having a particle diameter of 50μ or less, and 10 to 95% by weight of a normally solid water-soluble material which is a member selected from the group consisting of sodium primary phosphate, sodium secondary phosphate, sodium tertiary phosphate, sodium pyrophosphate, acid sodium pyrophosphate, sodium metaphosphate, and sodium polyphosphate, and potassium primary phosphate, potassium secondary phosphate, potassium tertiary phosphate, potassium pyrophosphate, acid potassium pyrophosphate, potassium metaphosphate, and potassium polyphosphate, and wherein said powder or granules have a particle diameter of 300μ or more.

2. The food additive powder or granule composition of claim 1 containing 0 to 2% by weight of a hydrophilic surface-active agent.

3. The food additive powder or granule composition of claim 1 wherein said sorbic acid comprises 20 to 80% by weight and said normally solid water-soluble material comprises 20 to 80% by weight of the composition.

4. The food additive powder or granule composition of claim 1 wherein the sorbic acid has a particle size 30μ or less, and said powder or granules have a particle size of 300μ to 1500μ.

5. The food additive powder or granule composition of claim 1 containing 0.5 to 1% by weight of a hydrophilic surface-active agent which is a member selected from the group consisting of cane sugar fatty acid esters, lecithins, fatty acid esters of sorbitan, and the reaction product between sorbitan fatty acid esters and polyoxyethylene.

6. A method for preserving food products which comprises adding to the food products a food preserving amount of the readily water-soluble food additive powder or granule composition of claim 1.

7. The method of claim 6 wherein the readily water-soluble food additive powder or granule composition is added to a food product which is a member selected from the group consisting of pickles, wine, fish sausage, meat sausage, jam, mayonnaise, margarine, dog food, and cat food.

* * * * *

UNITED STATES PATENT AND TRADEMARK OFFICE
CERTIFICATE OF CORRECTION

PATENT NO. : 4,172,897
DATED : October 30, 1979
INVENTOR(S) : Ueno, et al.

It is certified that error appears in the above–identified patent and that said Letters Patent are hereby corrected as shown below:

Please insert the following correction on the title page
-- [30]   Foreign Application Priority Data
    March 17, 1977   Japan.................... 52-28592

Signed and Sealed this

Fourteenth Day of July 1981

[SEAL]

Attest:

GERALD J. MOSSINGHOFF

Attesting Officer     Commissioner of Patents and Trademarks